United States Patent
Mogi et al.

(10) Patent No.: US 7,811,718 B2
(45) Date of Patent: Oct. 12, 2010

(54) FUEL CELL

(75) Inventors: Satoshi Mogi, Yamato (JP); Masaaki Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 851 days.

(21) Appl. No.: 11/735,162

(22) Filed: Apr. 13, 2007

(65) Prior Publication Data

US 2007/0248870 A1 Oct. 25, 2007

(30) Foreign Application Priority Data

Apr. 24, 2006 (JP) .............................. 2006-119883

(51) Int. Cl.
*H01M 8/04* (2006.01)
*H01M 8/06* (2006.01)
*H01M 8/24* (2006.01)
*H01M 8/22* (2006.01)

(52) U.S. Cl. ....................... 429/513; 429/413; 429/452; 429/458; 429/505

(58) Field of Classification Search ................ 429/403, 429/413, 452, 455, 456, 458, 459, 479, 505, 429/513

See application file for complete search history.

(56) References Cited

U.S. PATENT DOCUMENTS

| | | | |
|---|---|---|---|
| 3,573,102 A * | 3/1971 | Lane et al. .................. 429/414 |
| 4,444,851 A * | 4/1984 | Maru .......................... 429/439 |
| 5,514,486 A | 5/1996 | Wilson | |
| 5,543,240 A * | 8/1996 | Lee et al. ..................... 429/444 |
| 5,773,160 A * | 6/1998 | Wilkinson et al. .......... 429/434 |
| 6,207,312 B1 * | 3/2001 | Wynne et al. ............... 429/480 |

FOREIGN PATENT DOCUMENTS

JP        2000-58100 A        2/2000

OTHER PUBLICATIONS

Felix N. Buchi et al., "Operating Proton Exchange Membrane Fuel Cells Without Eternal Humidification of the Reactant Gases," 144 (8) J. Electrochem. Soc. 2767-72 (Aug. 1997).

* cited by examiner

*Primary Examiner*—Patrick Ryan
*Assistant Examiner*—Thomas H. Parsons
(74) *Attorney, Agent, or Firm*—Fitzpatrick, Cella, Harper & Scinto

(57) ABSTRACT

There is provided a fuel cell in which produced water can be efficiently conveyed to an upstream region of hydrogen gas flow, thereby quickly increasing the power generation performance of an electrolyte membrane after activation in a short period of time and giving a stable output for a long period of time and in which the directions of hydrogen gas flows in a first and a second fuel supply layers that share one oxygen supply layer are set to be opposite to each other.

4 Claims, 5 Drawing Sheets

FUEL CELL

BACKGROUND OF THE INVENTION

1. Field of the Invention

The present invention relates to a fuel cell in which hydrogen gas is reacted with oxygen in the atmosphere to generate power, and more particularly to a fuel cell in which moisture produced by the power generation is effectively utilized to reduce nonuniformity of wetness (i.e., degree of wetness) in the planar direction of an electrolyte membrane.

2. Description of the Related Art

A fuel cell using hydrogen gas as a fuel is significantly larger in the amount of energy supplied per unit volume compared with a conventional secondary battery and the whole structure thereof can be repetitively utilized by filling with the fuel. The fuel cell can be configured without adopting a movable mechanism and therefore makes less noise and generates no carbon dioxide during the power generation. For this reason, the fuel cell is expected to be applied as a lightweight, small-sized, long-life, pollution-free power supply in small electric devices such as mobile phones, notebook personal computers, personal digital assistants, electric shavers, and cordless cleaners.

U.S. Pat. No. 5,514,486 discloses a fuel cell in which a fuel supply layer and an oxygen supply layer are disposed on both sides of a polymer electrolyte membrane. In the fuel cell, a hole for supplying hydrogen gas serving also as a through hole for a connecting bolt is provided at the center. A fuel supply layer, a polymer electrolyte membrane layer, an oxygen supply layer, and a separator each formed in a circular shape are stacked in a given order. Further, hydrogen gas is reacted with oxygen in the atmosphere without using a pressure pump and blower, and the polymer electrolyte membrane is humidified by moisture as a reaction product which diffuses and moves in the oxygen supply layer.

Japanese Patent Application Laid-Open No. 2000-58100 discloses a fuel cell in which power generation cells are staked without using separators. A membrane electrode assembly is a functional material in which electrode layers are integrally formed on the front and rear surfaces of a polymer electrolyte membrane. Such membrane electrode assemblies are disposed on the front and rear surfaces of an oxygen supply layer whose side surfaces are open to the atmosphere, and a pair of fuel supply layers are disposed on the front and rear sides of the oxygen supply layer through the membrane electrode assembly.

In J. Electrochem. Soc., Vol. 144, No. 8, P 2767-2772, August 1997, The Electrochemical Society, Inc. "Operating Proton Exchange Membrane Fuel Cells Without External Humidification of the Reactant Gases", Felix N. Büchi and Supramaniam Srinivasan, a fuel cell is described in which the direction of hydrogen gas flow in a fuel supply layer is set to be opposite to the direction of oxygen flow in an oxygen supply layer on the opposite surfaces of a membrane electrode assembly. In this fuel cell, moisture produced on the oxygen supply layer side of the membrane electrode assembly is carried by air flow and conveyed to a downstream region to relatively increase the wetness of the membrane electrode assembly in the downstream region (see FIG. 7). In the downstream region where the wetness has been increased, water molecules permeate the fuel supply layer through the membrane electrode assembly and humidify hydrogen gas in an upstream region.

A polymer electrolyte membrane conveys hydrogen ions in a state in which a substantial amount of water molecules is held in the molecular structure thereof, so that the power generation efficiency is lowered if the membrane loses wetness due to evaporation or drying to decrease power density of a power generation surface. In particular, at the time of activation after a long period of suspension, the polymer electrolyte membrane is in a semi-dry state and is low in power generation efficiency. Therefore, when the heat generation of the polymer electrolyte membrane is increased with the start of the power generation, the humidification by the formation of water cannot follow the drying partly. This may cause delay in the rise of an output voltage of the fuel cell to be a disadvantage for the activation of an electric device having the fuel cell mounted thereon.

Accordingly, in the fuel cell described in U.S. Pat. No. 5,514,486, it is necessary to supply water to the oxygen supply layer prior to the activation or to incorporate a humidifier into a hydrogen gas supplying system, thereby ensuring the wetness of the polymer electrolyte membrane.

In the fuel cell described in J. Electrochem. Soc., Vol. 144, No. 8, P 2767-2772, August 1997, The Electrochemical Society, Inc. "Operating Proton Exchange Membrane Fuel Cells Without External Humidification of the Reactant Gases", Felix N. Buchi and Supramaniam Srinivasan, since an air flow in the oxygen supply layer is utilized to cause the produced water to extend over the entire surface of the polymer electrolyte membrane, neither supplying water to the oxygen supply layer nor incorporating a humidifier for hydrogen gas is unnecessary. However, since the circulation of produced water depends on an air flow in the oxygen supply layer, there is a possibility that a deficiency of the air flow may result in insufficient distribution of moisture, whereby the effect cannot be exhibited satisfactorily.

In the fuel cell described in Japanese Patent Application Laid-Open No. 2000-58100, the supply of oxygen to the membrane electrode assembly entirely depends on the natural diffusion of oxygen in the atmosphere and there is no steady flow. Therefore, water produced at a portion of the membrane electrode assembly where power generation is actively performed permeates the fuel supply layer and is conveyed to the downstream region of hydrogen gas flow, so that the wetness of the polymer electrolyte membrane in the upstream region cannot easily be increased.

For this reason, it takes a long period of time to wet the entire surface of the polymer electrolyte membrane satisfactorily to attain a high power generation density.

SUMMARY OF THE INVENTION

The present invention is directed to a fuel cell in which a complementary flow of hydrogen gas is utilized to decrease nonuniformity of moisture in an electrolyte membrane, thereby enabling the power generation performance of the electrolyte membrane after activation to be rapidly increased.

That is, the present invention provides a fuel cell which includes an oxygen supply layer having gas permeability in thickness and planar directions thereof; a pair of electrolyte membranes disposed on both surfaces in the thickness direction of the oxygen supply layer; a first fuel supply layer disposed on a side of one of the electrolyte membranes opposite to the oxygen supply layer side; and a second fuel supply layer disposed on a side of the other of the electrolyte membranes opposite to the oxygen supply layer side. The fuel cell further includes a fuel supply unit for forming, in the first and the second fuel supply layers, hydrogen gas flows which are opposite to each other with the oxygen supply layer being interposed therebetween.

A fuel cell according to a first embodiment of the present invention has such a configuration that a first and a second fuel supply layers complementarily supply moisture to each other through electrolyte membranes and an oxygen supply layer interposed therebetween described below.

In general, stored hydrogen gas contains little moisture. For this reason, the upstream region of a fuel supply layer is susceptible to drying unless supplied with moisture. Moisture produced in a power generation process while hydrogen gas flows through the fuel supply layer is supplied through the electrolyte membrane, thereby increasing the moisture content toward a downstream region. The moisture is further condensed by consumption of hydrogen gas in the power generation process. Then, excess moisture flows toward the oxygen supply layer through the electrolyte membrane by concentration diffusion. The moisture diffused from the downstream region of one of the fuel supply layers into the oxygen supply layer diffuses into the upstream region of the other of the fuel supply layers which is disposed opposite to the one of the oxygen supply layers. Accordingly, by disposing the fuel supply layers of the opposite hydrogen gas flow directions so as to face each other with the interposition of the one of the electrolyte membranes, the oxygen supply layer, and the other of the electrolyte membranes, moisture can be complementarily supplied to each other.

The movement of moisture suppresses nonuniformity of the wetness between the upstream and the downstream regions of the first and the second fuel supply layers. Therefore, a pair of electrolyte membranes each rapidly reaches required wetness over the entire surface thereof, so that even when activated in a semi-dry state, the pair of electrolyte membranes can rapidly increase the power generation performance to ensure a high power generation density.

Further, the first and the second fuel supply layers convey moisture two-dimensionally to average nonuniformity of the partial pressure of the moisture in the oxygen supply layer during the power generation to prevent the electrolyte membranes from being locally flooded by the produced water. Accordingly, even when a high output operation is continued under unfavorable conditions such as low temperature and high humidity, the reaction hardly stops due to flooding.

In other words, because the directions of hydrogen gas flows in a pair of fuel supply layers that share one oxygen supply layer are opposite to each other, a fuel cell can be provided in which the oxygen supply layer is uniformly humidified even during a high output operation and a stable output can be obtained.

Further features of the present invention will become apparent from the following description of exemplary embodiments with reference to the attached drawings.

DESCRIPTION OF THE EMBODIMENTS

A fuel cell according to one embodiment of the present invention is described in detail with reference to the drawings. The fuel cell according to the present invention is not limited to the restrictive configuration of a fuel cell 100 described below. Other embodiments in which a part or all of configuration of the embodiments is replaced by their substitute configuration is available provided that fuel supply layers are disposed at front and rear surfaces of an oxygen supply layer having gas permeability in the thickness direction through an electrolyte membrane, respectively.

For example, in the below-mentioned embodiments, description will be made by taking as an example a configuration in which electrolyte membranes are disposed on front and rear surfaces of a fuel supply layer and such structural members are stacked in a plurality of stages. However, for example, a three-layer configuration may be adopted in which a fuel supply layer is provided on each side of an oxygen supply layer. A thin tape-shaped configuration may be also adopted in which two thin fuel supply layers having outer surfaces sealed are, respectively, overlaid on an electrolyte membrane and disposed on front and rear surfaces of one oxygen supply layer. A fuel tank may be provided for each fuel supply layer. Instead of supplying hydrogen gas from a fuel tank, hydrogen gas may be supplied from a reforming apparatus which generates hydrogen gas from a hydrocarbon fuel.

The fuel cell 100 can be embodied as a fuel cell pack which is attachable to and detachable from portable electronic devices such as digital cameras, digital camcorders, small projectors, small printers, notebook personal computers, electric shavers, codeless cleaners and the like. In addition, the fuel cell 100 can also be embodied in such a configuration that the power generation portion is integrally incorporated in a device and the fuel tank portion is attachable thereto and detachable therefore, or that both the power generation and the fuel tank portions are incorporated into a device and fuel is supplied to the fuel tank from the outside when needed.

Embodiment 1

Figure 1:
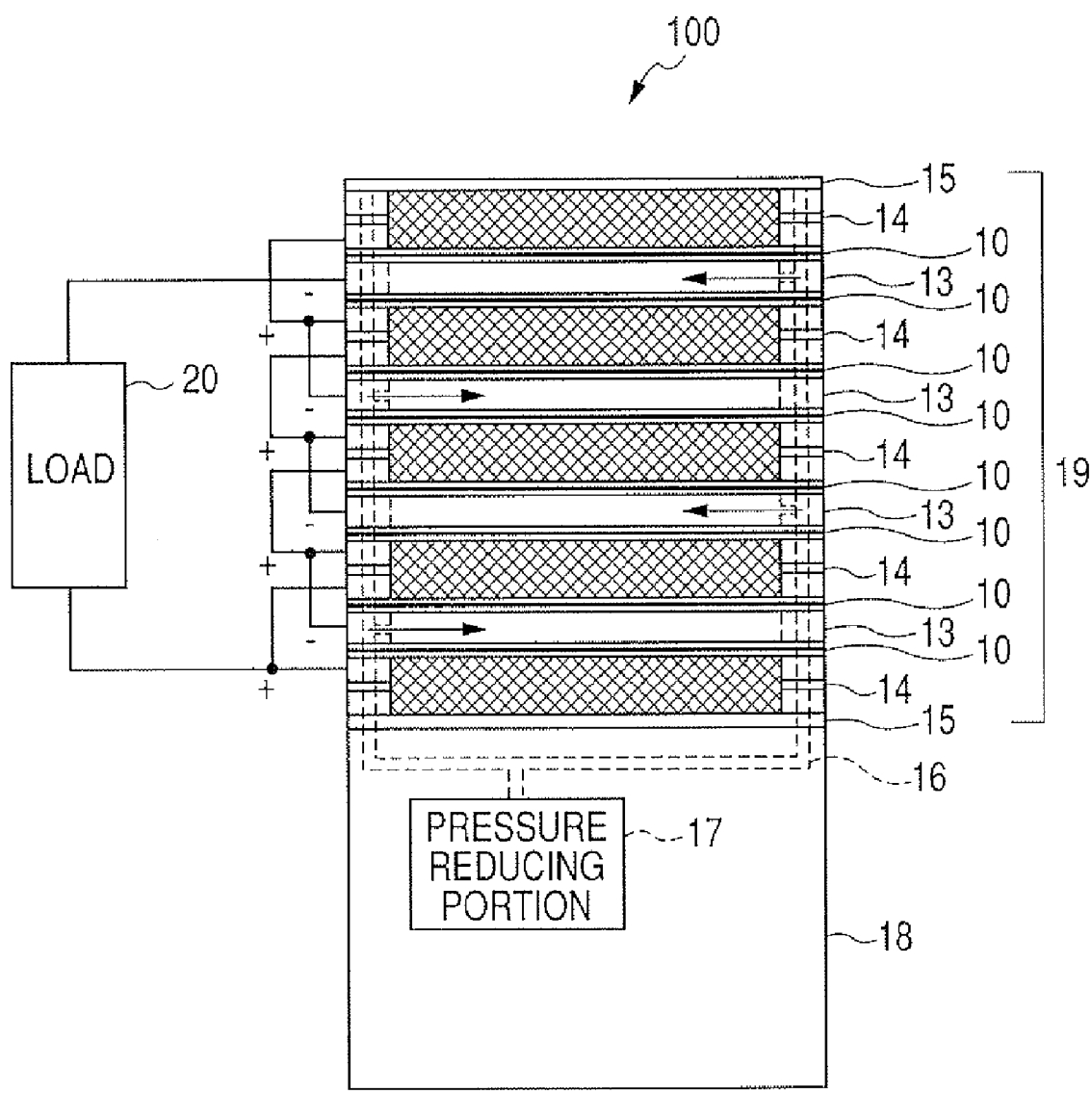
FIG. 1 is an explanatory diagram illustrating the configuration of a fuel cell according to Embodiment 1.
Figure 2:
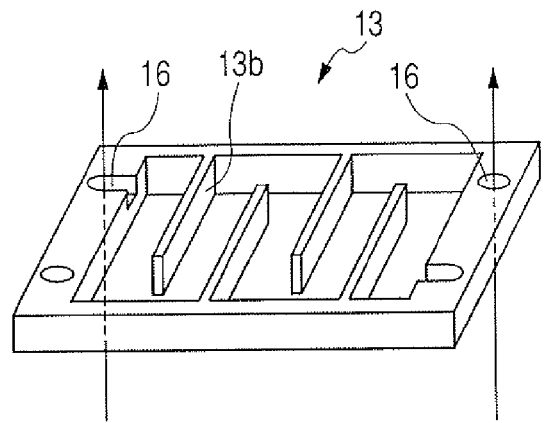
FIG. 2 is a perspective view of the appearance of a fuel supply layer.
Figure 3:
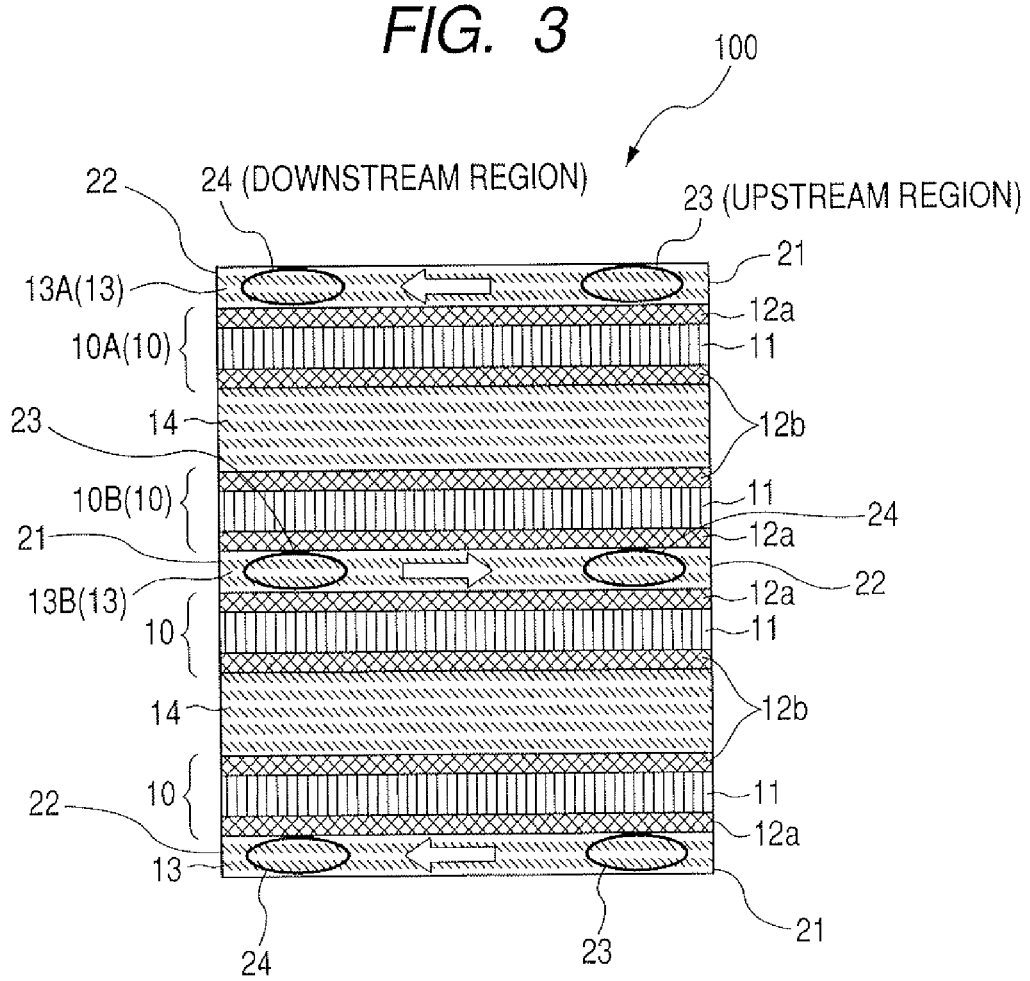
FIG. 3 is an explanatory diagram illustrating the flow of hydrogen gas in a fuel supply layer.

FIG. 1 is an explanatory diagram illustrating the configuration of a fuel cell according to Embodiment 1. FIG. 2 is a perspective view of appearance of a fuel supply layer. FIG. 3 is an explanatory diagram illustrating the flow of hydrogen gas in the fuel supply layer. FIG. 4 is an explanatory diagram illustrating the relationship between the flow of hydrogen gas and the movement of moisture.

As illustrated in FIG. 1, a fuel cell 100 of the first embodiment includes a fuel tank 18 for storing hydrogen gas and a power generation portion 19 which performs an electrochemical reaction of hydrogen gas stored in the fuel tank 18 to generate power. The power generation portion 19 has a structure in which an oxygen supply layer 14 and a fuel supply layer 13 are alternately stacked through a membrane electrode assembly 10 in the thickness direction (Y) of the fuel supply layer 13 and end plates 15 are disposed on both ends of the unit. The upper and lower surfaces of the stacked oxygen supply layer 14 and the fuel supply layer 13 communicate with the membrane electrode assemblies 10, and the oxygen supply layer 14 and the fuel supply layer 13 do not include a separator which seals and separates the oxygen supply layer 14 and the fuel supply layer 13.

In the next place, a fuel supply system in the first embodiment is described. Hydrogen gas taken out of the fuel tank 18 is reduced in pressure to be slightly higher than 1 atm ($1.01325 \times 10^5$ Pa) by a pressure reducing portion 17 and regulated to be supplied to a left and a right main flow paths 16 as fuel supply channel. The left and the right main channels 16 are alternately connected to the stacked fuel supply layers 13. That is to say, a pair of fuel supply layers 13 opposing each other through one oxygen supply layer 14 in the vertical direction in the figure has inlets for hydrogen gas on the sides opposite to each other in a planar direction (X), so that hydrogen gas flows of opposite directions are formed in the pair of fuel supply layers 13 as indicated by arrows in FIG. 1. Incidentally, the fuel cell of the present invention can be embodied also for cases where the layers are not planar but curved. In that case, the term "thickness direction (Y)" refers to a direction in which the distance between planes is the shortest at the point and the term "planar direction (X and Z)" refers to a direction which is perpendicular to the so defined thickness direction (Y).

The oxygen supply layer 14 has gas permeability both in the thickness direction (Y) and in the planar direction (X and Z) and also has an insulating property as a whole, and a pair of oxygen supply layers 14 for each fuel supply layer 13 are electrically separated and provided with output terminals. One fuel supply layer 13 and two oxygen supply layers 14 provided on and under the fuel supply layer 13 are taken to be a unit power generation cell. The oxygen supply layers 14 on and under the fuel supply layer 13 are short circuited and a positive (+) output is taken out therefrom and a negative (−) output is taken out form the fuel supply layer 13. A plurality of stacked power generation cells are connected to each other in series and an output of the entire fuel cell 100 is taken out from between the (+) and (−) terminals. As the material of the oxygen supply layer 14, there are included porous insulating materials such as resins, or combinations thereof with porous conductive material such as foamed metal.

Since the output of the fuel cell 100 is connected to a load 20, the power generation portion 19 generates power only in an amount corresponding to current which flows through the load 20, thereby maintaining the output voltage. Hydrogen gas in an amount corresponding to the power generation amount flows from the fuel tank 18 into the fuel supply layers 13 and supplied as hydrogen ions to the membrane electrode assemblies 10 on and under the fuel supply layer 13. In the oxygen supply layers 14, oxygen in the atmosphere reacts with hydrogen ions on the surface layers of the membrane electrode assemblies 10 to form water molecules. At this time, excess electrons produced accompanying the formation of hydrogen ions on the fuel supply layer 13 side of the membrane electrode assembly 10 flow into the oxygen supply layer 14 side of the membrane electrode assembly 10 through the load 20.

FIG. 2 is a schematic perspective view illustrating a fuel supply layer used in the present invention. The fuel supply layer 13 has a structure in which ribs 13b are so disposed alternately as to form a flow path for hydrogen gas flowing from the main flow path 16 to the downstream region. A solid material with gas permeability and conductivity may be provided between the ribs 13b and brought into plane-contact with the membrane electrode assemblies 10 to effectively reduce the electrical resistance. In the figure, the left portion of the hydrogen gas flow path communicating with the main channel 16 is an upstream region and the right portion thereof is a downstream region.

FIG. 3 is a schematic cross-sectional view illustrating the structure of the fuel cell in further detail. The fuel cell 100 has a structure in which a plurality of membrane electrode assemblies 10 are stacked. The membrane electrode assemblies 10 have the same structure and each include a fuel electrode 12a and an oxidizer electrode 12b with a polymer electrolyte membrane 11 being interposed therebetween. The polymer electrolyte membrane 11 includes a polymer material with proton conductivity. Such a polymer material includes Nafion™ (trademark of DuPont), Flemion™ (trademark of ASAHI GLASS CO., LTD.) and Aciplex™ (trademark of Asahi Kasei Corp.).

An inlet 21 is a portion where hydrogen gas is supplied to the fuel supply layer 13. An outlet 22 is a portion where unconsumed hydrogen gas is discharged from the fuel supply layer 13. That is to say, when the respective fuel supply layers 13 are considered from the viewpoint of the fuel flow, an upstream region 23 and a down stream region 24 exist in each thereof.

The fuel electrode 12a and the oxidizer electrode 12b each have a catalyst layer being in contact with and integrally formed with the polymer electrolyte membrane 11 and a gas diffusion electrode disposed in external contact with the catalyst layer. The catalyst layer is composed of a conductive porous material containing platinum fine particles, and the gas diffusion layer is composed of a conductive material with medium opening diameters and gas permeability such as carbon paper or carbon cloth.

A plurality of membrane electrode assemblies 10 are disposed in such a manner that the fuel electrodes 12a oppose each other or the oxidizer electrodes 12b oppose each other. A porous material with gas permeability in the three dimensional direction or a supporting member for the membrane electrode assembly 10 is inserted into a space through which the membrane electrode assemblies 10 oppose. This forms the fuel supply layer 13 for supplying hydrogen gas to the membrane electrode assembly 10 into the space between the membrane electrode assemblies 10 where the fuel electrodes 12a oppose each other, and forms an oxygen supply layer 14 for supplying oxygen in the atmosphere into the space between the membrane electrode assemblies 10 where the oxidizer electrodes 12b oppose each other.

For convenience of description, the upper one of the fuel supply layers 13 opposing each other in the vertical direction with the oxygen supply layer 14 being interposed therebetween is referred to as a first fuel supply layer 13A and the lower fuel supply layer 13 is referred to as a second fuel supply layer 13B. The membrane electrode assembly 10 between the oxygen supply layer 14 and the first fuel supply layer 13A is referred to as a first membrane electrode assembly 10A and the membrane electrode assembly 10 between the oxygen supply layer 14 and the second fuel supply layer 13B is referred to as a second membrane electrode assembly 10B.

To the first fuel supply layer 13A is supplied hydrogen gas from the right-hand side opening as the inlet 21 and discharged from the left-hand side opening as the outlet 22. To the second fuel supply layer 13B is supplied hydrogen gas from the left-hand side opening as the inlet 21 and discharged from the right-hand side opening as the outlet 22. For this reason, an upstream region 23 and a downstream region 24 of hydrogen gas are opposite to each other in the planar direction in the first and the second fuel supply layers 13A and 13B, and the directions of hydrogen gas flows are also opposite to each other. Incidentally, the present invention can be applied to a so-called dead-ended fuel cell in which the outputs 22 of the fuel supply layers are hermetically sealed and hydrogen gas equal in amount to hydrogen gas consumed in a power generation process is supplied from the inlet 21. In that case also, the directions in which hydrogen gas flows in the fuel supply layers is fundamentally the same as described above, there also exist the upstream and the downstream regions 23 and 24.

In this first embodiment, the fuel supply layers are configured such that hydrogen gas is supplied in the direction indicated by the arrows in FIG. 3. In the respective fuel supply layers 13 (13A and 13B) of the pair of membrane electrode assemblies 10 (10A and 10B) that share the oxygen supply layer 14, the directions of hydrogen gas flows are set to be opposite to each other. Hydrogen gas is stored in a hydrogen storage alloy with which the fuel tank 18 is filled and hydrogen held in the hydrogen storage alloy is supplied without humidification.

On the other hand, the both sides of the oxygen supply layer 14 in the direction perpendicular to the drawing sheet of FIG. 3 (corresponding to the Z direction in FIG. 1) are open to the atmosphere to take oxygen in the atmosphere into the oxygen supply layer 14 by natural diffusion. The taken-in oxygen is supplied to the oxidizer electrodes of the membrane electrode assemblies 10 according to oxygen concentration gradient of the oxygen supply layer 14. The movement of substances in the fuel cell 100 thus configured is described with reference to FIG. 4.

Figure 4A:
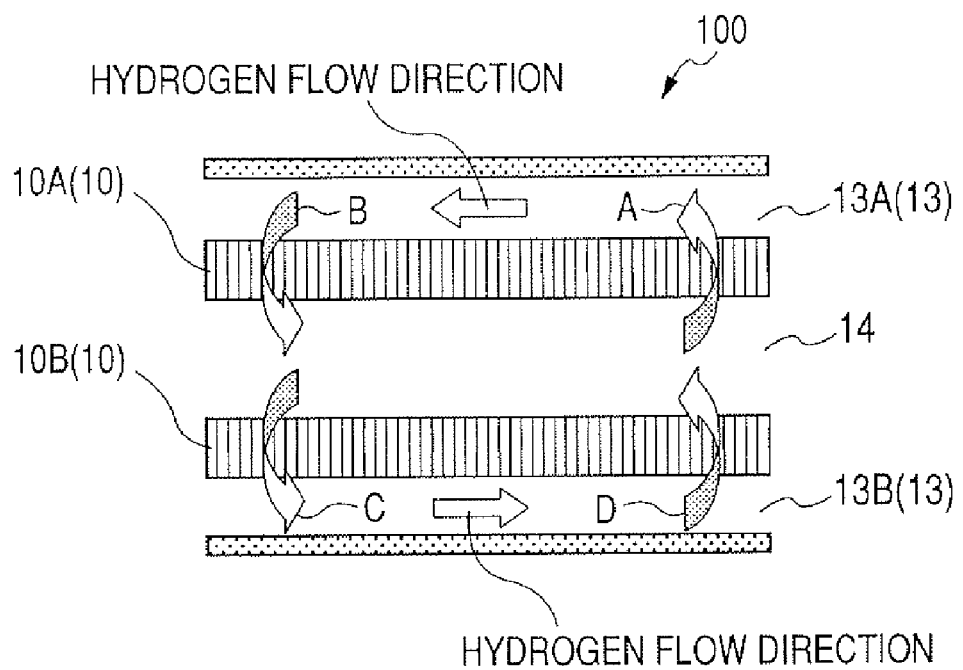
FIGS. 4A and 4B are explanatory diagrams illustrating the relationship between the flow of hydrogen gas and the movement of moisture.

As illustrated in FIG. 4A, the oxidizer electrodes (12b in FIG. 3) of the first and the second membrane electrode assemblies 10A and 10B share the oxygen supply layer 14. The first fuel supply layer 13A is formed on the side of the first membrane electrode assembly 10A opposite to the oxygen supply layer 14 side and the second fuel supply layer 13B is formed on the side of the second membrane electrode assembly 10B opposite to the oxygen supply layer 14 side. As indicated by the arrows in the figure, hydrogen gas as fuel is supplied from the right-hand side to the left-hand side of the figure in the first fuel supply layer 13A and hydrogen gas is supplied from the left-hand side to the right-hand side of the figure in the second fuel supply layer 13B.

The oxidizer electrode (12b in FIG. 3) consumes oxygen during the power generation of the fuel cell 100. This decreases the concentration of oxygen in the oxygen supply layer 14 and oxygen is supplied from the atmosphere at the periphery of the oxygen supply layer 14 to the oxygen supply layer 14 by diffusion. On the other hand, a part of water produced in the oxidizer electrode (12b in FIG. 3) is discharged from the side surface of the oxygen supply layer 14 by diffusion, while the rest of the water remains in the oxygen supply layer 14.

In the first fuel supply layer 13A, hydrogen gas is supplied from the right-hand side in the figure without humidification and is dry. This increases the water concentration gradient between the oxidizer electrode (12b in FIG. 3) and the fuel electrode (12a in FIG. 3). By the water concentration gradient, the movement of moisture from the oxidizer electrode (12b in FIG. 3) to the fuel electrode (12a in FIG. 3) through the first membrane electrode assembly 10A (so-called back diffusion) becomes dominant.

As indicated by the arrow A in FIG. 4A, the movement of moisture from the oxygen supply layer 14 to the first fuel supply layer 13A is generated, whereby hydrogen gas in the first fuel supply layer 13A is humidified. At the downstream in the first fuel supply layer 13A, hydrogen gas humidified at the upstream region flows into to decrease the water concentration gradient between the oxidizer electrode (12b in FIG. 3) and the fuel electrode (12a in FIG. 3), whereby the movement of moisture accompanying the movement of protons (so-called electroosmosis) becomes dominant. As a result, as indicated by the arrow B in FIG. 4A, moisture moves from the fuel electrode (12a in FIG. 3) to the oxidizer electrode (12b in FIG. 3) to humidify air in the oxygen supply layer 14.

In the second fuel supply layer 13B which, together with the first fuel supply layer 13A, shares the oxygen supply layer 14, hydrogen gas is supplied from the left-hand side in FIG. 4A without humidification and is dry. This increases the water concentration gradient between the oxidizer electrode (12b in FIG. 3) and the fuel electrode (12a in FIG. 3), whereby the movement of moisture (so-called back diffusion) by the water concentration gradient becomes dominant.

As indicated by the arrow C in FIG. 4A, the movement of moisture from the oxygen supply layer 14 to the second fuel supply layer 13B is generated, whereby hydrogen gas in the second fuel supply layer 13B is humidified. At the downstream in the second fuel supply layer 13B, hydrogen gas humidified at the upstream region flows into to decrease the water concentration gradient between the oxidizer electrode (12b in FIG. 3) and the fuel electrode (12a in FIG. 3), whereby the movement of moisture accompanying the movement of protons (so-called electroosmosis) becomes dominant. As a result, as indicated by the arrow D in FIG. 4A, moisture moves from the fuel electrode (12a in FIG. 3) to the oxidizer electrode (12b in FIG. 3) to humidify air in the oxygen supply layer 14.

Figure 4B:
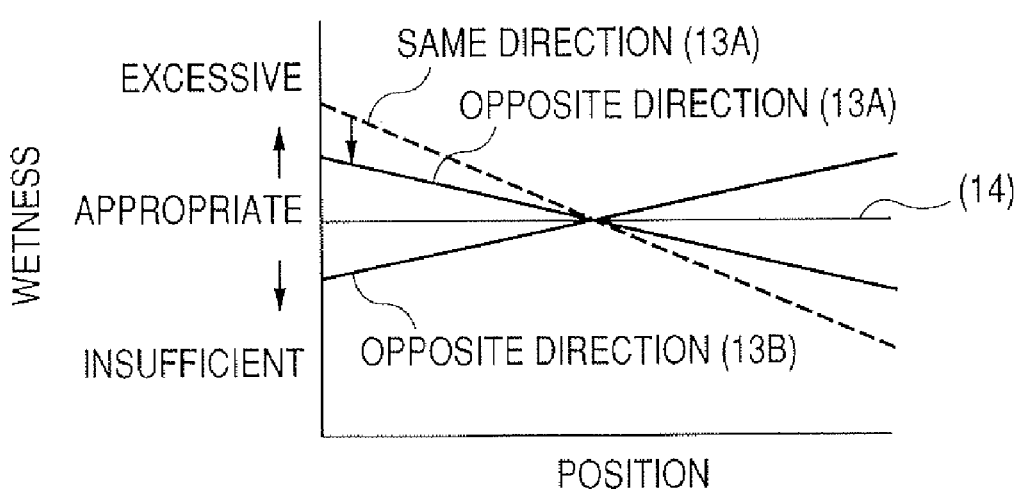

As described above, since the directions in which hydrogen gas flows are set to be opposite to each other in the first and the second fuel supply layers 13A and 13B, moisture in the fuel cell 100 moves as indicated by the arrows A, B, C, and D in the mentioned order. By this movement, the oxygen supply layer 14 is humidified uniformly as illustrated in FIG. 4B. For this reason, even if the oxygen supply layer 14 of the fuel cell 100 is supplied with oxygen by natural diffusion in a substantially windless state, the output rapidly rises without any unit for humidifying hydrogen gas. Thereafter, a stable output can be obtained for a long period of time.

In the fuel cell 100, since the directions in which hydrogen gas flows are set to be opposite to each other in the pair of fuel supply layers 13 which share the oxygen supply layer 14, the pair of fuel supply layers 13 are humidified uniformly from the upstream region to the downstream region thereof. Such fuel cell 100 gives a stable output for a long period of time without a humidifying/moisture-controlling mechanism and can be suitably adopted for a power source of small electric devices.

Embodiment 2

Figure 5:
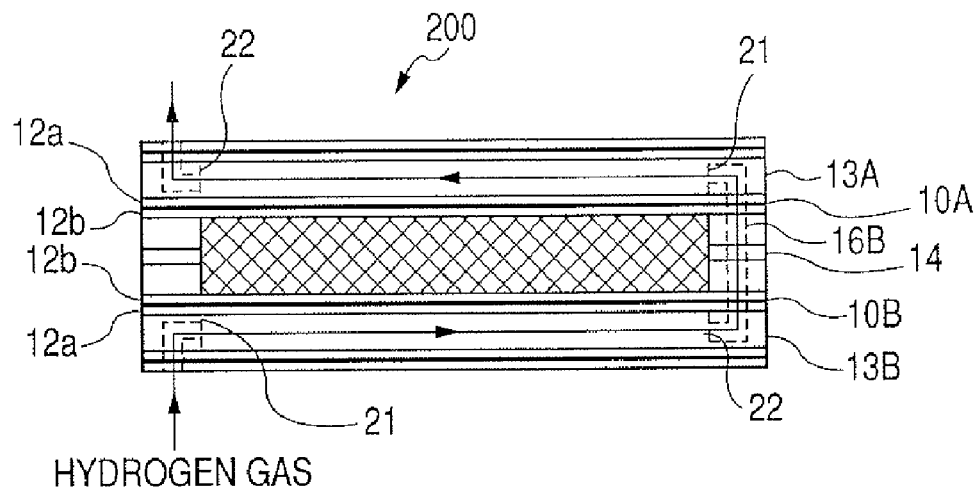
FIG. 5 is an explanatory diagram illustrating the configuration of a fuel cell according to Embodiment 2.

FIG. 5 is a schematic cross-sectional view illustrating the configuration of a fuel cell according to Embodiment 2. The fuel cell 200 of this second embodiment is partly different from that of Embodiment 1 in the supply line of hydrogen gas. Other than that, the fuel cell 200 is configured in the same way as that in Embodiment 1, so that the elements which are common to those in FIGS. 1 to 4 are identified like reference characters and detailed description thereof is omitted.

As illustrated in FIG. 5, in the fuel cell 200 of this second embodiment, the right-hand opening of a second fuel supply layer 13B in the figure is connected in series to the right-hand opening of a first fuel supply layer 13A in the figure using a supply line path 16B to communicate with each other. Further, the left-side opening of the second fuel supply layer 13B in the figure is taken to be an inlet 21 and the left-side opening of the first fuel supply layer 13A in the figure is taken to be an outlet 22. Thus, the supply line path 16B is caused to cross the oxygen supply layer 14 to reverse the direction in which hydrogen gas flows, so that hydrogen gas flows of opposite directions are formed in the planar direction in the first and the second fuel supply layers 13A and 13B.

In the second embodiment, since the directions in which hydrogen gas flows are set to be opposite to each other in the first and the second fuel supply layers 13A and 13B that share the oxygen supply layer 14, moisture diffusion is generated in the thickness direction of the oxygen supply layer 14. The moisture diffusion uniformizes the moisture concentration in the entirety of the oxygen supply layer 14 and eliminates the variation in wetness between the first and the second membrane electrode assemblies 10A and 10B. Therefore, the fuel cell 200 gives a stable output for a long period of time without a humidifying/moisture-controlling mechanism.

Embodiment 3

Although the first and the second embodiments have a structure in which the oxygen supply layers 14 on and under which the membrane electrode assemblies 10 are disposed and the fuel supply layer 13 are stacked in a plurality of stages, the pair of fuel supply layers 13 sharing the oxygen supply layer 14 does not always need to have the membrane electrode assemblies 10 disposed thereon and thereunder. There may also be adopted such a configuration that an air-tight material having a layer with gas permeability formed on one surface thereof is used and the surface of the layer with gas permeability is connected to the membrane electrode assembly 10.

As suggested in FIG. 4A, the fuel cell of this third embodiment has a three layer structure in which a pair of fuel supply layers sharing an oxygen supply layer is disposed. The membrane electrode assemblies are disposed between the oxygen supply layer and the fuel supply layers, respectively. The upper and lower surfaces and the side surface of the fuel supply layers are hermetically sealed to prevent hydrogen gas from leaking into the atmosphere.

In this third embodiment, the directions in which hydrogen gas flows are set to be opposite to each other in the pair of fuel supply layers that share the oxygen supply layer, thereby generating moisture diffusion in the thickness direction of the oxygen supply layer 14. The moisture diffusion uniformizes the moisture concentration in the entirety of the oxygen supply layer and eliminates the variation in wetness between the pair of membrane electrode assemblies. Therefore, the fuel cell 200 gives a stable output for a long period of time without a humidifying/moisture-controlling mechanism.

(Fuel Cell of Comparative Example)

Figure 6:
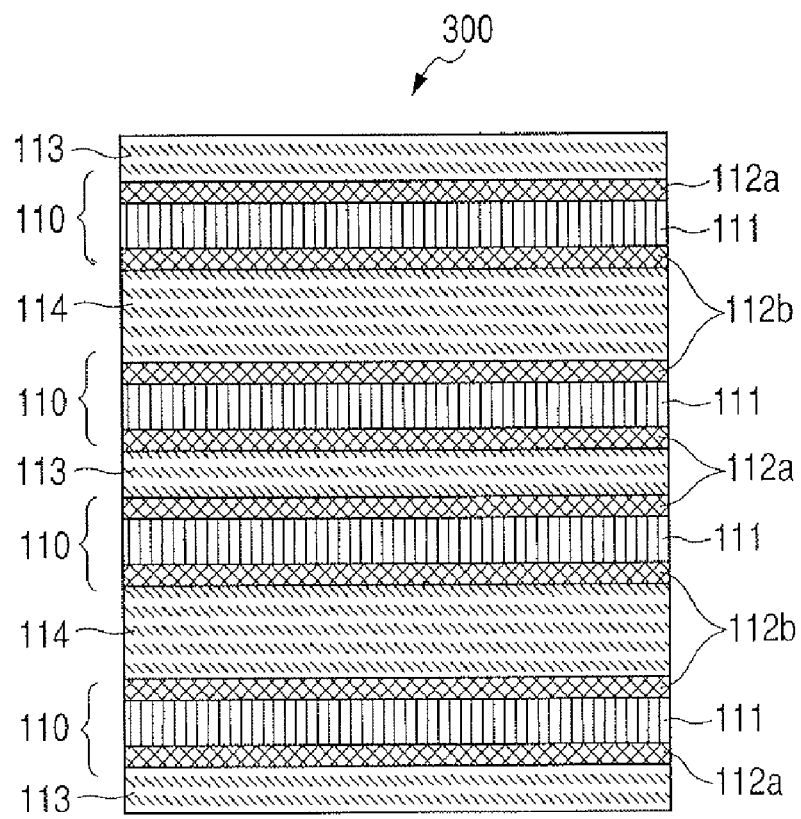
FIG. 6 is an explanatory diagram illustrating the configuration of a fuel cell of a comparative example.
Figure 7:
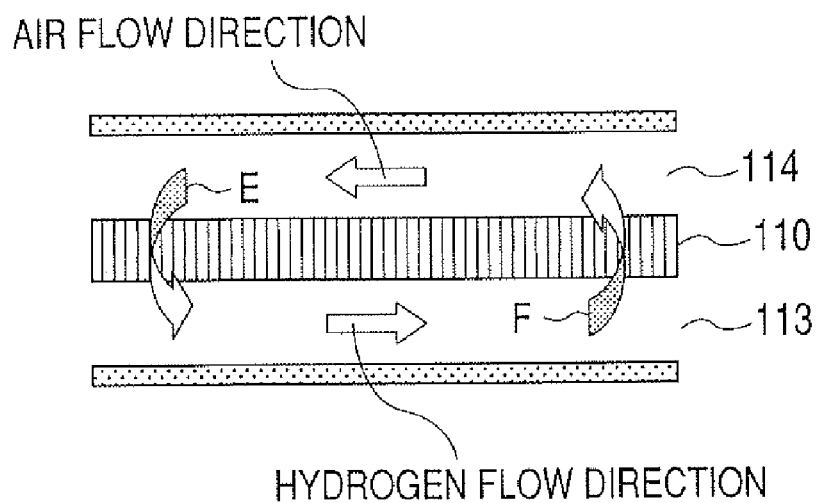
FIG. 7 is an explanatory diagram illustrating the movement of moisture in a fuel cell in which air is forcibly circulated.
Figure 8:
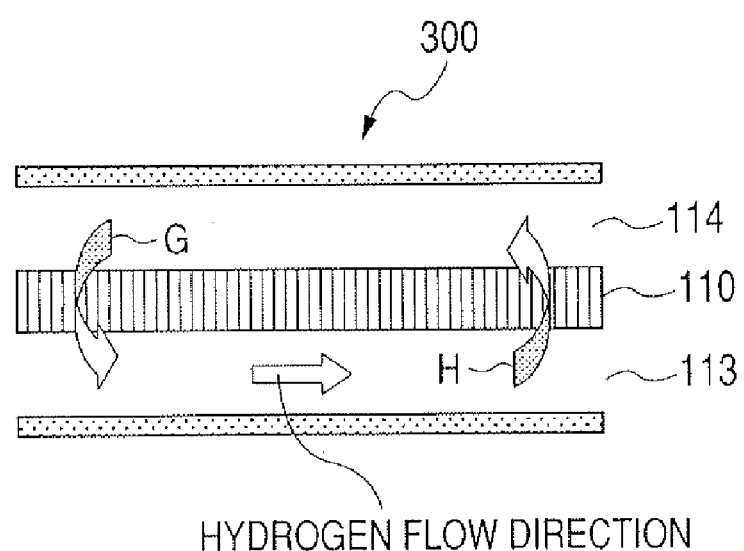
FIG. 8 is an explanatory diagram illustrating the movement of moisture in a fuel cell of a comparative example.

FIG. 6 is an explanatory diagram illustrating the configuration of a fuel cell of a comparative example. FIG. 7 is an explanatory diagram illustrating the movement of moisture in a fuel cell in which air is forcibly circulated. FIG. 8 is an explanatory diagram illustrating the movement of moisture in a fuel cell of the comparative example.

A stationary power generator and a fuel cell for an automobile are equipped with a pressurizing mechanism for pressurized and supplying fuel gas, a circulating mechanism for forcibly circulating air, a cooling mechanism for suppressing temperature rise accompanying a reaction and a humidifying mechanism for humidifying fuel gas. However, a fuel cell attached to small electric devices desirably has a simple configuration that does not need pressurization, circulation, cooling, humidification, and the like.

As illustrated in FIG. 6, in the fuel cell 300 of this comparative example of, fuel electrodes 112a or oxidizer electrodes 112b of the membrane electrode assembly 110 oppose each other. A fuel supply layer 113 is formed between the fuel electrodes 112a of the membrane electrode assembly 110 and an oxygen supply layer 114 is formed between the oxidizer electrodes 112b. This can reduce the size in the stacking direction of the fuel supply layers 113 and the oxygen supply layers 114.

As illustrated in FIG. 7, when air is forcibly circulated in the oxygen supply layer 114, the direction in which air flows in the oxygen supply layer 114 is desirably set to be opposite to the direction in which hydrogen gas flows in the fuel supply layer 113. This is because moisture diffusion in the oxygen supply layer 114 and the fuel supply layers 113 can complimentarily be realized and because water produced in the oxidizer electrodes 112b humidifies hydrogen gas and air, so that a hydrogen gas humidifying mechanism can be omitted.

More specifically, for the movement of moisture through the membrane electrode assembly 110, electroosmosis and back diffusion phenomena need to be taken into consideration. The electroosmosis is a phenomenon in which moisture moves from the fuel electrodes 112a to the oxidizer electrodes 112b accompanying the movement of protons and depends on a power generation current. On the other hand, the back diffusion is a phenomenon in which moisture moves from the oxidizer electrodes 112b to the fuel electrodes 112a by the water concentration gradient in the thickness direction of the membrane electrode assembly 110.

As illustrated in FIG. 7, non-humidified hydrogen gas as a fuel is supplied from the left-hand side to the right-hand side in the fuel supply layer 113 and air as an oxidizer is supplied from the right-hand side to the left-hand side in the oxygen supply layer 114. At this time, as indicated by the arrows E and F, moisture passes through the membrane electrode assembly 110 in the thickness direction thereof and is exchanged between the fuel supply layer 113 and the oxygen supply layer 114. In the left-hand portion of FIG. 7 (upstream of hydrogen gas flow), the non-humidified hydrogen and the air humidified in the oxygen supply layer 114 increase the water concentration gradient between the oxidizer electrodes 112b and the fuel electrodes 112a, whereby the movement of moisture due to back diffusion becomes dominant. Accordingly, moisture moves from the oxygen supply layer 114 to the fuel supply layer 113 (as indicated by the arrow E) to humidify hydrogen gas in the fuel supply layer 113.

In the right-hand portion of FIG. 7 (downstream of hydrogen gas flow), the hydrogen gas humidified in the fuel supply layer 113 and non-humidified air decrease the water concentration gradient between the oxidizer electrodes 112b and the fuel electrodes 112a. For this reason, the movement of moisture due to electroosmosis becomes dominant, whereby moisture moves from the fuel electrodes 112a to the oxidizer electrodes 112b (as indicated by the arrow F) to humidify air in the oxygen supply layer 114.

However, in the fuel cell 300 of the comparative example illustrated in FIG. 6, since oxygen is supplied by natural diffusion, the direction in which hydrogen gas is supplied can be set to be in one direction, but the direction in which air is supplied cannot be specifically set. For this reason, the direction in which air flows in the oxygen supply layer 114 cannot be set to be opposite to the direction in which hydrogen gas flows in the fuel supply layer 113. Consequently, complimentary moisture diffusion in the oxygen supply layer 114 and the fuel supply layer 113 cannot be realized. Providing a fan or an air circulating mechanism to form a flow of air in the oxygen supply layer 114 does not meet requirements for noise and cost reduction.

As illustrated in FIG. 8, non-humidified hydrogen gas as a fuel is supplied from the left-hand side to the right-hand side, while air in the atmosphere is supplied by diffusion to cause no flow. At this time, at the upstream region of the hydrogen gas flows moisture moves from the oxygen supply layer 114 to the fuel supply layer 113 dried by non-humidified hydrogen gas (as indicated by the arrow G). On the other hand, at the downstream region of the hydrogen gas flow, moisture moves from the fuel supply layer 113 to the oxygen supply layer 114 by the hydrogen gas humidified in the fuel supply layer 113 (as indicated by the arrow H). However, since any steady flow does not exist in the oxygen supply layer 114, and therefore since the effect to aid moisture movement, moisture will not supplemented from the downstream region toward the upstream region of the hydrogen gas flow. For this reason, the oxygen supply layer 114 at the upstream region of the hydrogen gas flow is liable to be dried, while the oxygen supply layer 114 at the downstream region of the hydrogen gas flow is liable to be excessively humidified. There have been cases where when the fuel cell 300 of the comparative example is operated for a long period of time in this state, the output becomes unstable. For this reason, in a fuel cell in which oxygen is supplied by diffusion, a fuel cell which is small in size and stable in output cannot be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-119883, filed Apr. 24, 2006, which is hereby incorporated by reference herein in its entirety.

What is claimed is:

1. A fuel cell comprising:
   an oxygen supply layer having gas permeability in thickness and planar directions thereof;
   a pair of electrolyte membranes disposed on both surfaces in the thickness direction of the oxygen supply layer;
   a first fuel supply layer disposed on a side of one of the electrolyte membranes opposite to the oxygen supply layer side;
   a second fuel supply layer disposed on a side of the other of the electrolyte membranes opposite to the oxygen supply layer side; and
   a fuel supply unit for forming, in the first and the second fuel supply layers, hydrogen gas flows which are opposite to each other with the oxygen supply layer being interposed therebetween.

2. The fuel cell according to claim 1, further comprising inlets through each of which hydrogen gas is introduced into corresponding one of the pair of fuel supply layers, and outlets through each of which hydrogen gas flows out of corresponding one of the pair of fuel supply layers, wherein the inlet for hydrogen gas in the second fuel supply layer is provided at a location which is in opposition to the location of the outlet in the first fuel supply layer with the oxygen supply layer being interposed therebetween.

3. The fuel cell according to claim 1, wherein the first fuel supply layer has gas permeability in thickness and planar directions thereof and serves also as the second fuel supply layer; stack structures each comprising the first fuel supply layer, the pair of electrolyte membranes, and the oxygen supply layer are stacked in a plurality of stages; and the oxygen supply layer comprises an insulating structure for cutting off electrical conduction in a thickness direction thereof.

4. A fuel cell comprising:
   an oxygen supply layer which has gas permeability in thickness and planar directions thereof and communicates with the atmosphere on a side surface thereof;
   a pair of electrolyte membranes which are disposed on both surfaces in the thickness direction of the oxygen supply layer and supplied with oxygen by the oxygen supply layer;
   a first fuel supply layer which is disposed on a side of one of the electrolyte membranes opposite to the oxygen supply layer side and supplies hydrogen gas to the one electrolyte membrane;
   a second fuel supply layer which is disposed on a side of the other of the electrolyte membranes opposite to the oxygen supply layer side and supplies hydrogen gas to the other electrolyte membrane,
   wherein an upstream region in the second fuel supply layer is disposed at a location which is in opposition to the location of a downstream region in the first fuel supply layer with the oxygen supply layer being interposed therebetween.

* * * * *